US012731934B2

(12) United States Patent
Sundarakrishnamachari et al.

(10) Patent No.: US 12,731,934 B2
(45) Date of Patent: Sep. 8, 2026

(54) CONNECTOR ASSEMBLY WITH DEVICE FOR ADAPTING A TERMINAL TO A CONNECTOR BODY AND METHOD OF ASSEMBLING SAME

(71) Applicant: Aptiv Technologies AG, Schaffhausen (CH)

(72) Inventors: Rangarajan Sundarakrishnamachari, Chennai (IN); Siddhan Manickam, Tamilnadu (IN); Dale Smutny, Canfield, OH (US); Duane Brantingham, Cortland, OH (US)

(73) Assignee: Aptiv Technologies AG, Schaffhausen (CH)

( * ) Notice: Subject to any disclaimer, the term of this patent is extended or adjusted under 35 U.S.C. 154(b) by 318 days.

(21) Appl. No.: 18/380,307

(22) Filed: Oct. 16, 2023

(65) Prior Publication Data

US 2025/0125552 A1 Apr. 17, 2025

(51) Int. Cl.
*H01R 13/424* (2006.01)
*H01R 13/52* (2006.01)
*H01R 43/20* (2006.01)

(52) U.S. Cl.
CPC ........... *H01R 13/424* (2013.01); *H01R 43/20* (2013.01); *H01R 13/5205* (2013.01)

(58) Field of Classification Search
None
See application file for complete search history.

(56) References Cited

U.S. PATENT DOCUMENTS 4,655,525 A * 4/1987 Hunt, III ............ H01R 13/4367 439/747
4,768,970 A * 9/1988 Nestor ............... H01R 13/5221 439/589
5,954,548 A 9/1999 Stabroth
8,152,572 B1 * 4/2012 Liu ...................... H01R 13/432 439/746

(Continued)

FOREIGN PATENT DOCUMENTS

EP 0159466 A2 10/1985

OTHER PUBLICATIONS

"Extended European Search Report for Application 24196518.5"; European Patent Office; Mailed on Feb. 18, 2025; 11 Pages.

*Primary Examiner* — Oscar C Jimenez
(74) *Attorney, Agent, or Firm* — Billion & Armitage

(57) ABSTRACT

A connector assembly includes a connector housing defining a terminal cavity within, the terminal cavity having a first primary locking feature configured to retain a first terminal having a first retaining feature within the terminal cavity. The connector assembly also includes a second terminal having a second retaining feature that is configured to interface with a corresponding second primary locking feature that is of a different design than the first primary locking feature. The connector assembly further includes an adapter having a first attachment feature configured to engage with the second retaining feature of the second terminal to attach the second terminal to the adapter and having a second attachment feature configured to engage with the first primary locking feature of the terminal cavity to attach the adapter to the connector housing. A method of assembling a connector assembly is also presented.

17 Claims, 13 Drawing Sheets

(56) References Cited

U.S. PATENT DOCUMENTS

| | | | | |
|---|---|---|---|---|
| 2016/0352035 | A1 | 12/2016 | Nagai et al. | |
| 2020/0169030 | A1* | 5/2020 | Ferderer .............. | H01R 13/514 |
| 2021/0281003 | A1* | 9/2021 | Zucca .................... | H01R 13/42 |
| 2024/0250468 | A1* | 7/2024 | Kopelos ............... | H01R 13/518 |

* cited by examiner

CONNECTOR ASSEMBLY WITH DEVICE FOR ADAPTING A TERMINAL TO A CONNECTOR BODY AND METHOD OF ASSEMBLING SAME

TECHNICAL FIELD OF THE INVENTION

The invention generally relates to a device for adapting terminals, such as electrical terminals, to fit into connector bodies that are designed to accept terminals having a different design, particularly a different retainer design.

BACKGROUND

Terminals, such as electrical terminals attached to wire cables, are usually designed to interface with a specific terminal cavity design. This typically drives the selection of connector housing to have the terminal cavities needed to accommodate the terminals selected. Original equipment manufacturers (OEMs) may specify a particular terminal type that is accommodated by a particular connector housing used in an application. Therefore, a means of adapting the terminal to be retained in a non-compatible terminal cavity design in a connector housing is desired.

FIGS. 1, 2A, and 2B show an existing terminal 10 and connector housing 12 design having features in the terminal 10 and the connector housing 12 for retaining the terminal 10 within the connector housing 12. The terminal cavity 14 of the connector housing 12 shown in FIGS. 1, 2A, and 2B has a blocking mechanism 16 that engages a fin 18 extending from the electrical terminal 10 to inhibit rearward movement of the terminal 10 in the cavity 14. The terminal 10 also defines a pair of protrusions 20 that extend perpendicularly to the insertion axis X of the terminal 10. These protrusions 20 are arranged opposite one another and are offset from the fin 18. These protrusions 20 are configured to engage with a locking mechanism 22 that is inserted into the connector housing 12 after the terminal 10 is inserted within the terminal cavity 14.

SUMMARY

According to one or more aspects of the present disclosure, a connector assembly includes a connector housing defining a terminal cavity within, the terminal cavity having a first primary locking feature configured to retain a first terminal having a first retaining feature within the terminal cavity. The connector assembly also includes a second terminal having a second retaining feature that is configured to interface with a corresponding second primary locking feature of the terminal cavity that is of a different design than the first primary locking feature. The connector assembly further includes an adapter having a first attachment feature configured to engage with the second retaining feature of the second terminal to attach the second terminal to the adapter and having a second attachment feature configured to engage with the first primary locking feature of the terminal cavity to attach the adapter to the connector housing.

According to one or more aspects of the present disclosure, an adapter is configured to retain an electrical terminal within a terminal cavity of a connector housing that has incompatible terminal retaining features. The adapter includes a first attachment feature configured to engage with a retaining feature of the electrical terminal to secure the electrical terminal to the adapter and a second attachment feature configured to engage with a first primary locking feature of the terminal cavity to attach the adapter to the connector housing.

According to one or more aspects of the present disclosure, a method of assembling a connector includes the steps of:

- providing a connector housing defining a terminal cavity within, the terminal cavity having a first primary locking feature configured to retain a first terminal having a first retaining feature within the terminal cavity;
- providing a second terminal having a second retaining feature that is configured to interface with a corresponding second primary locking feature of the terminal cavity that is of a different design than the first primary locking feature;
- providing an adapter having a first attachment feature and a second attachment feature;
- engaging the first attachment feature of the adapter with the second retaining feature of the second terminal to attach the second terminal to the adapter; and
- engaging the second attachment feature of the adapter with the first primary locking feature of the terminal cavity to attach the adapter to the connector housing.

BRIEF DESCRIPTION OF THE DRAWINGS

The present invention will now be described, by way of example with reference to the accompanying drawings, in which.

DETAILED DESCRIPTION

Figure 1:
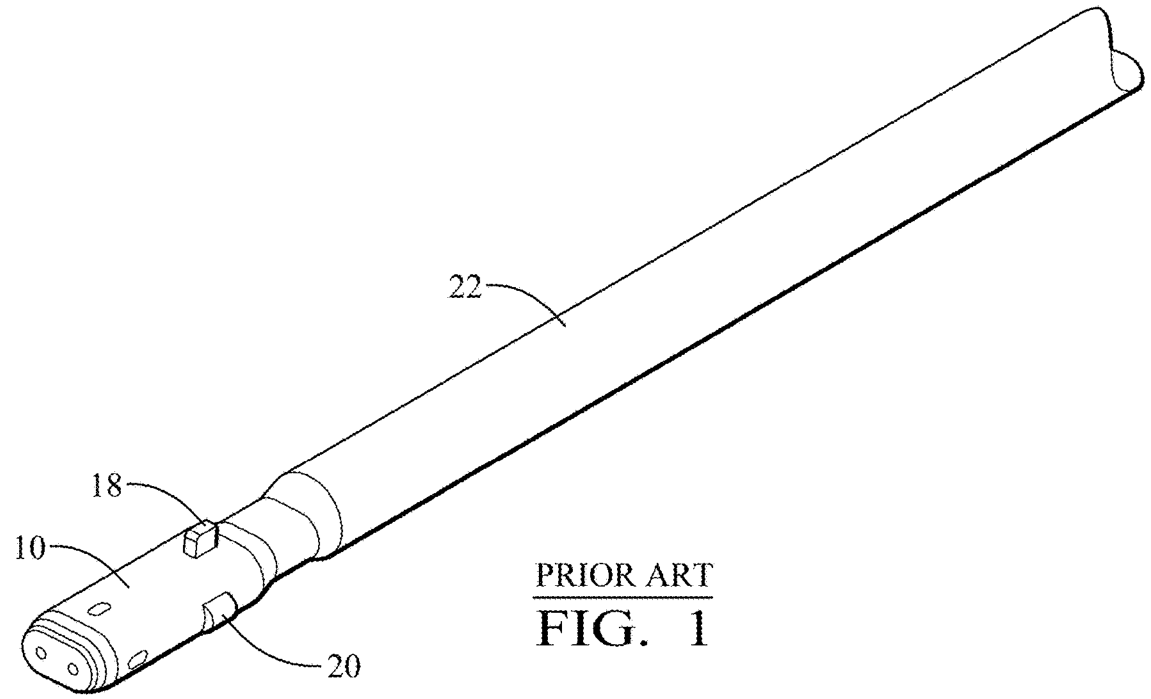
PRIOR ART FIG. 1
FIG. 1 is an isometric view of a terminal in accordance with the prior art.
Figure 2A:
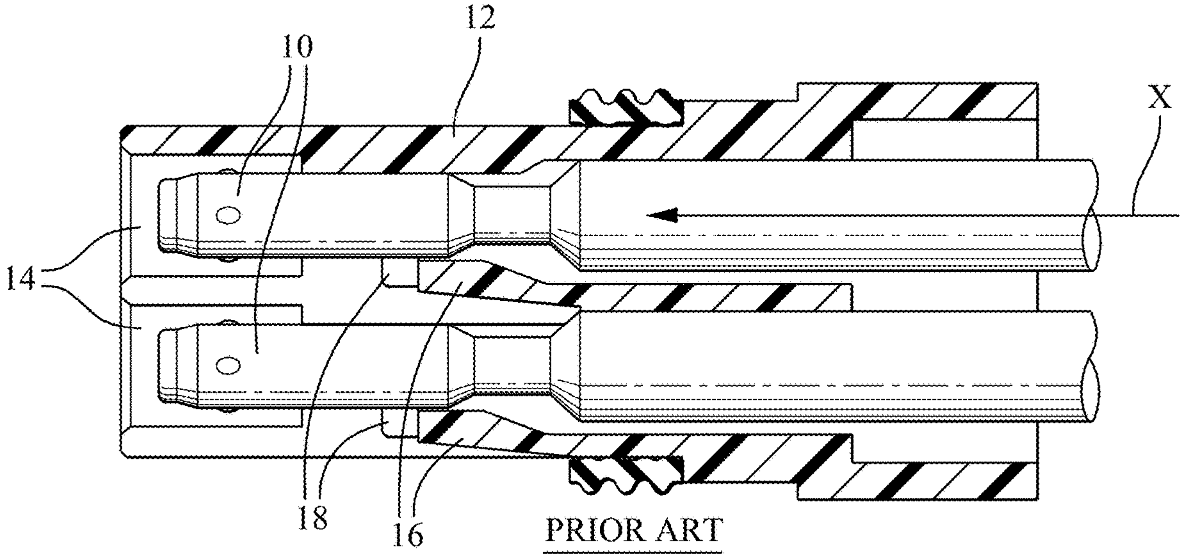
PRIOR ART FIG. 2A
FIG. 2A is a side cross-section view of a connector containing the terminal of FIG. 1 in accordance with the prior art.
Figure 2B:
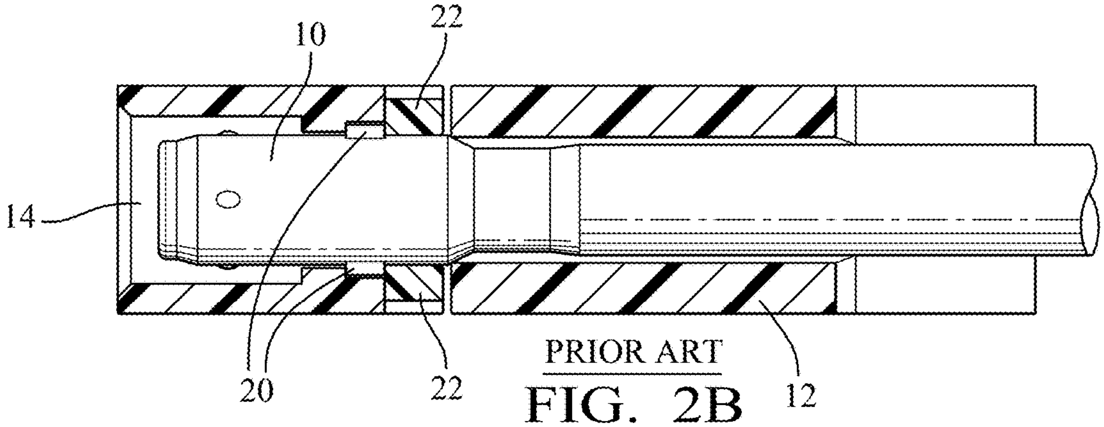
PRIOR ART FIG. 2B
FIG. 2B is a top cross-section view of a connector containing the terminal of FIG. 1 in accordance with the prior art.
Figure 3:
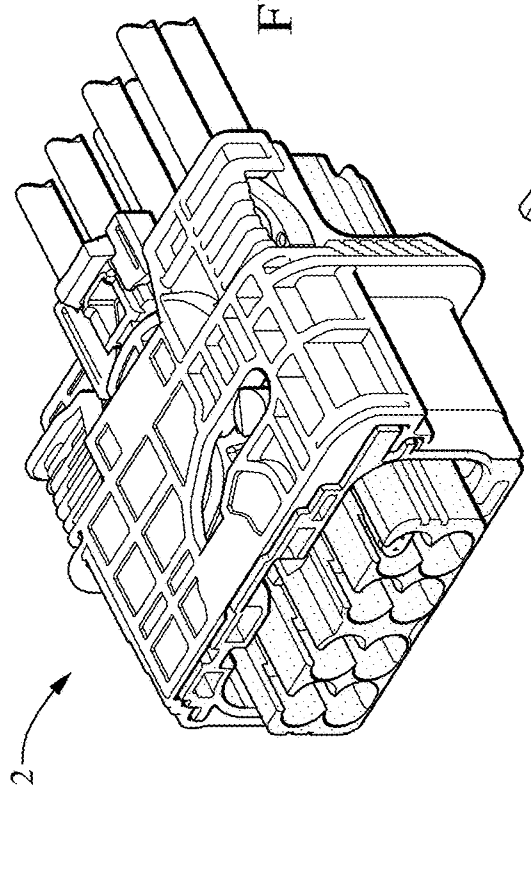
FIG. 3 is an isometric view of a connector assembly in accordance with some embodiments of the invention.

Nonlimiting examples of several adapters configured to allow an electrical terminal 10 having retaining features configured to retain the electrical terminal attached to an electrical cable in a connector housing 12 possessing one particular terminal cavity 14 design as shown in FIGS. 1, 2A, and 2B to be retained within another connector housing having a different terminal cavity design as shown in FIG. 3 are presented herein. As described above, the terminal cavity 14 of the connector housing 12 shown in FIGS. 1, 2A, and 2B has a blocking mechanism 16 that engages a fin 18 extending from the electrical terminal 10 to inhibit rearward movement of the terminal 10 in the cavity 14 and the terminal 10 defines a pair of protrusions 20 that engage a locking mechanism 22 to retain the terminal 10 in the terminal cavity 14 of the connector housing 12.

Figure 4:
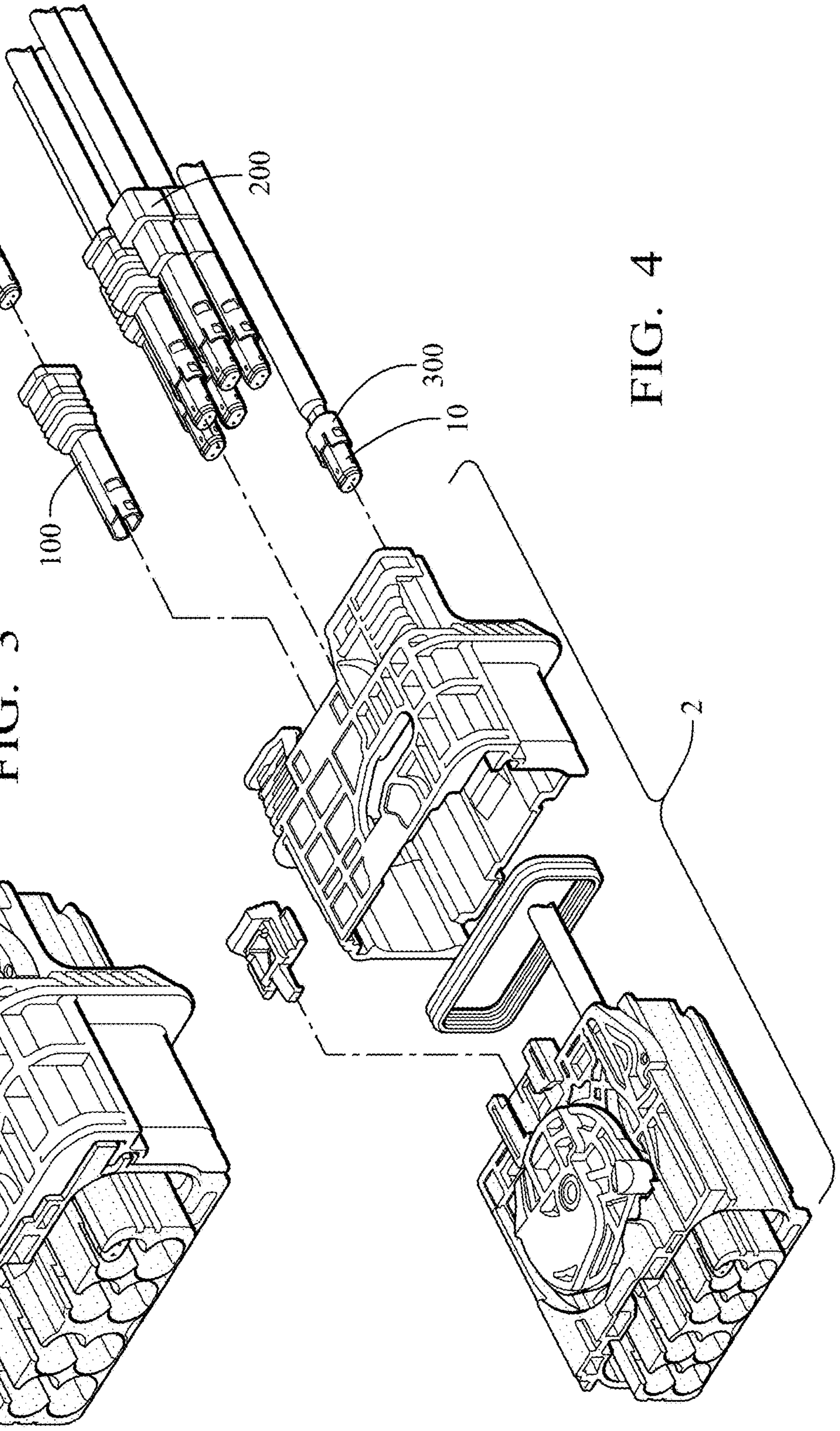
FIG. 4 is an exploded view of the connector assembly of FIG. 3 in accordance with some embodiments of the invention.
Figure 5:
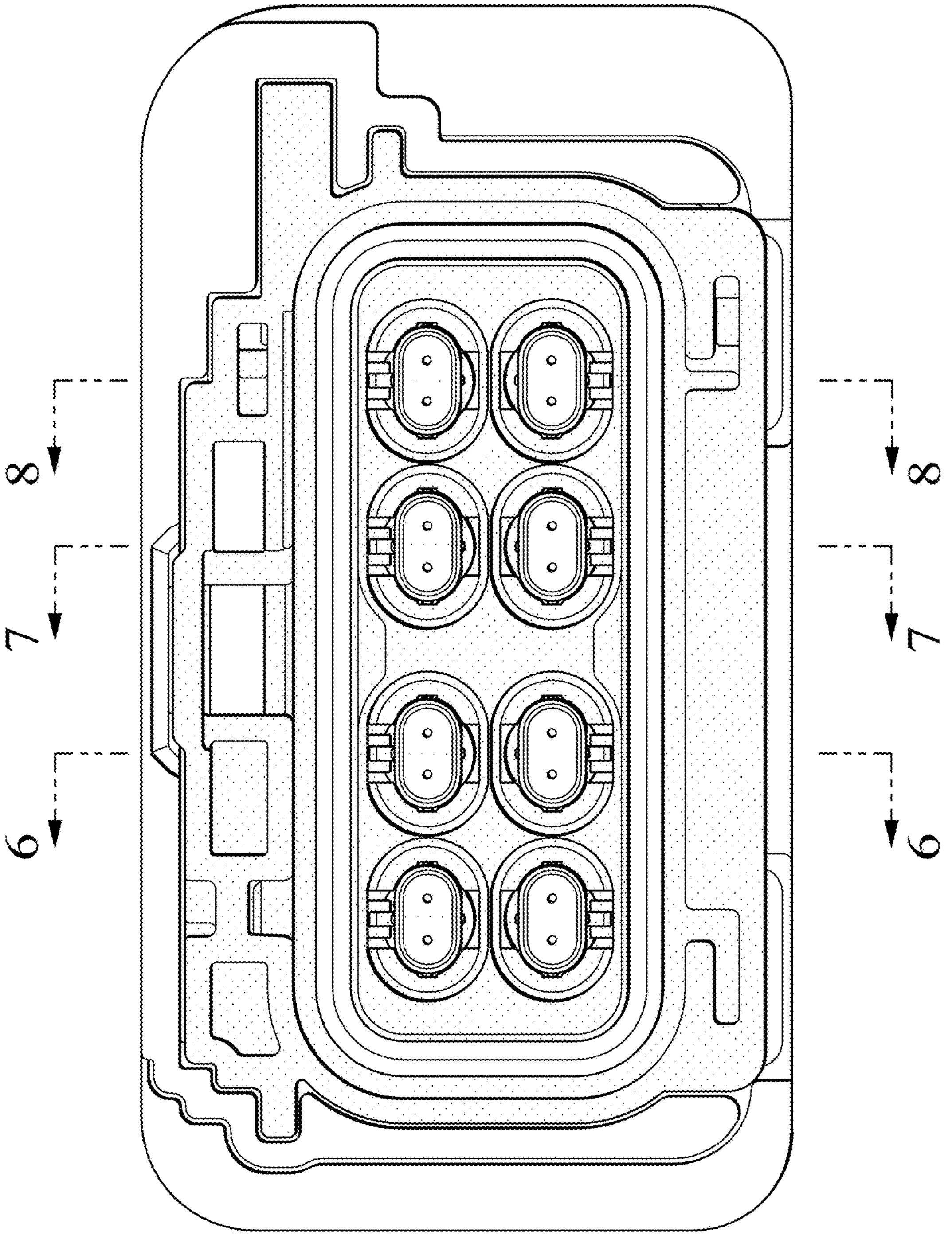
FIG. 5 is a front view of the connector assembly of FIG. 3 in accordance with some embodiments of the invention.
Figure 6:
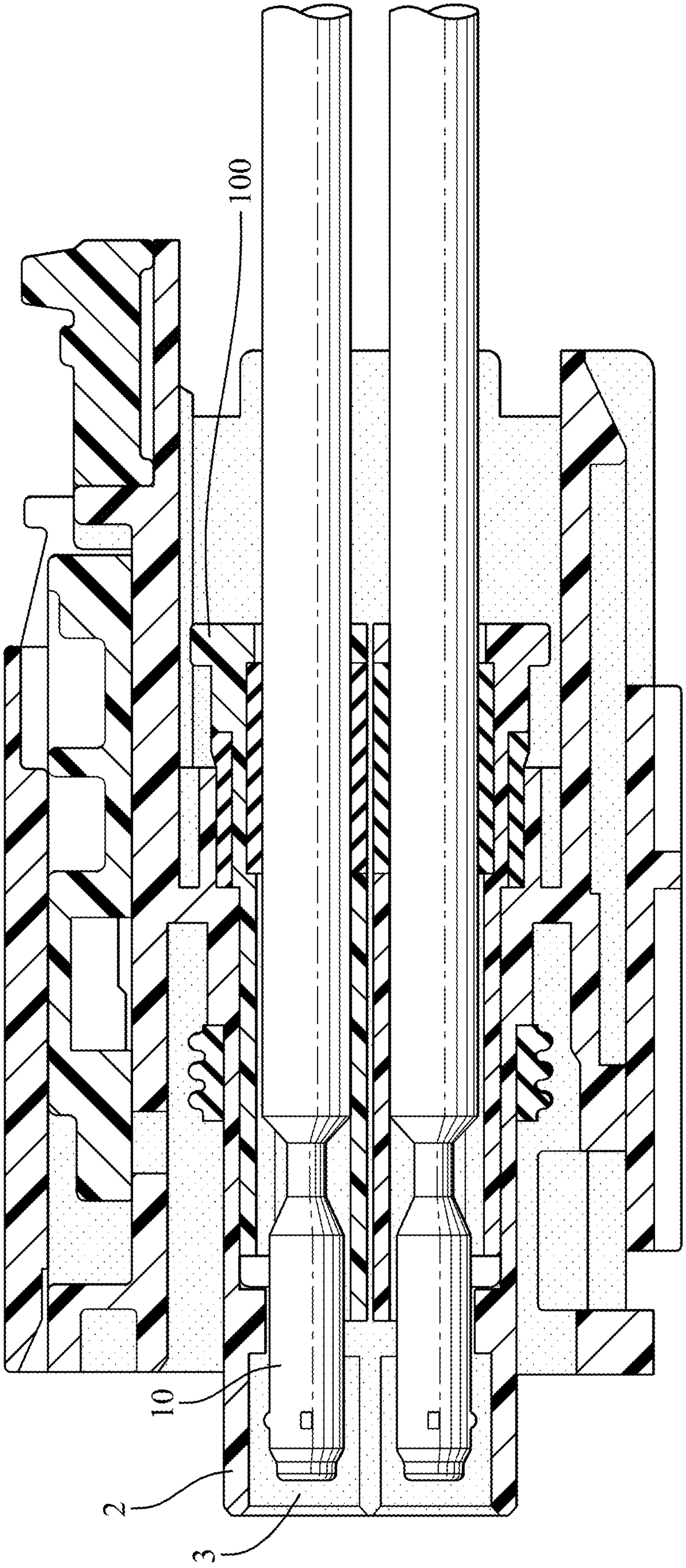
FIG. 6 is a cross-section view of the connector assembly of FIG. 5 along section line A-A in accordance with some embodiments of the invention.
Figure 7:
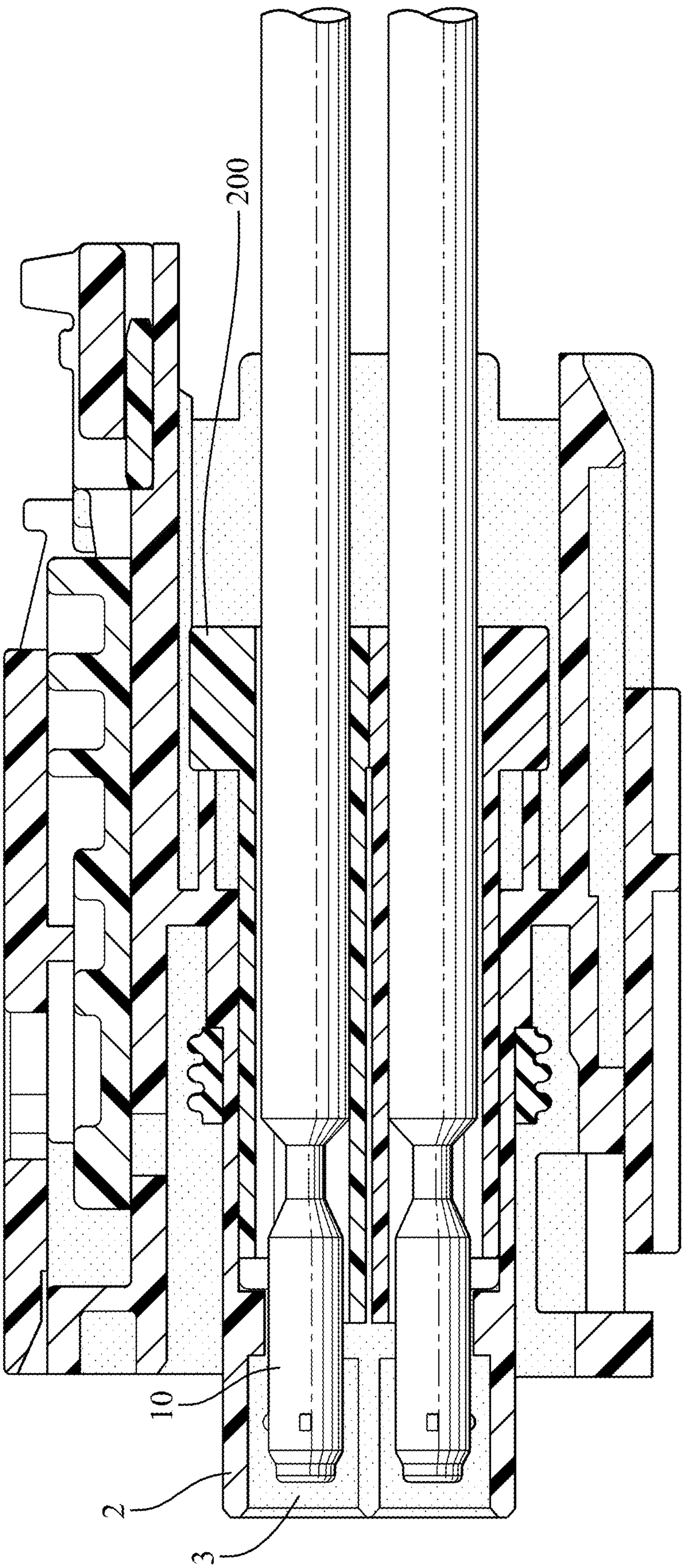
FIG. 7 is a cross-section view of the connector assembly of FIG. 5 along section line B-B in accordance with some embodiments of the invention.
Figure 8:
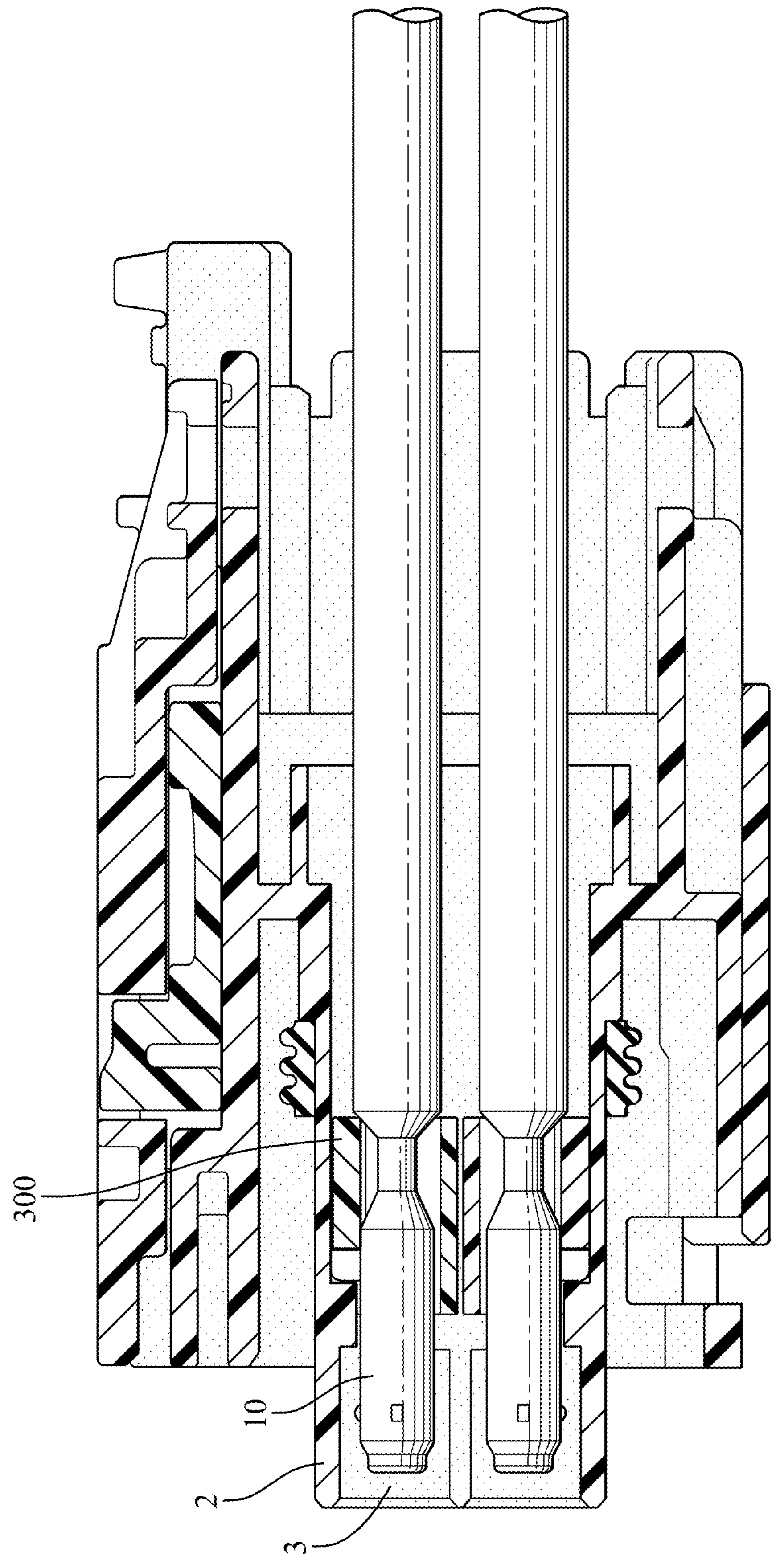
FIG. 8 is a cross-section view of the connector assembly of FIG. 5 along section line C-C in accordance with some embodiments of the invention.
Figure 9:
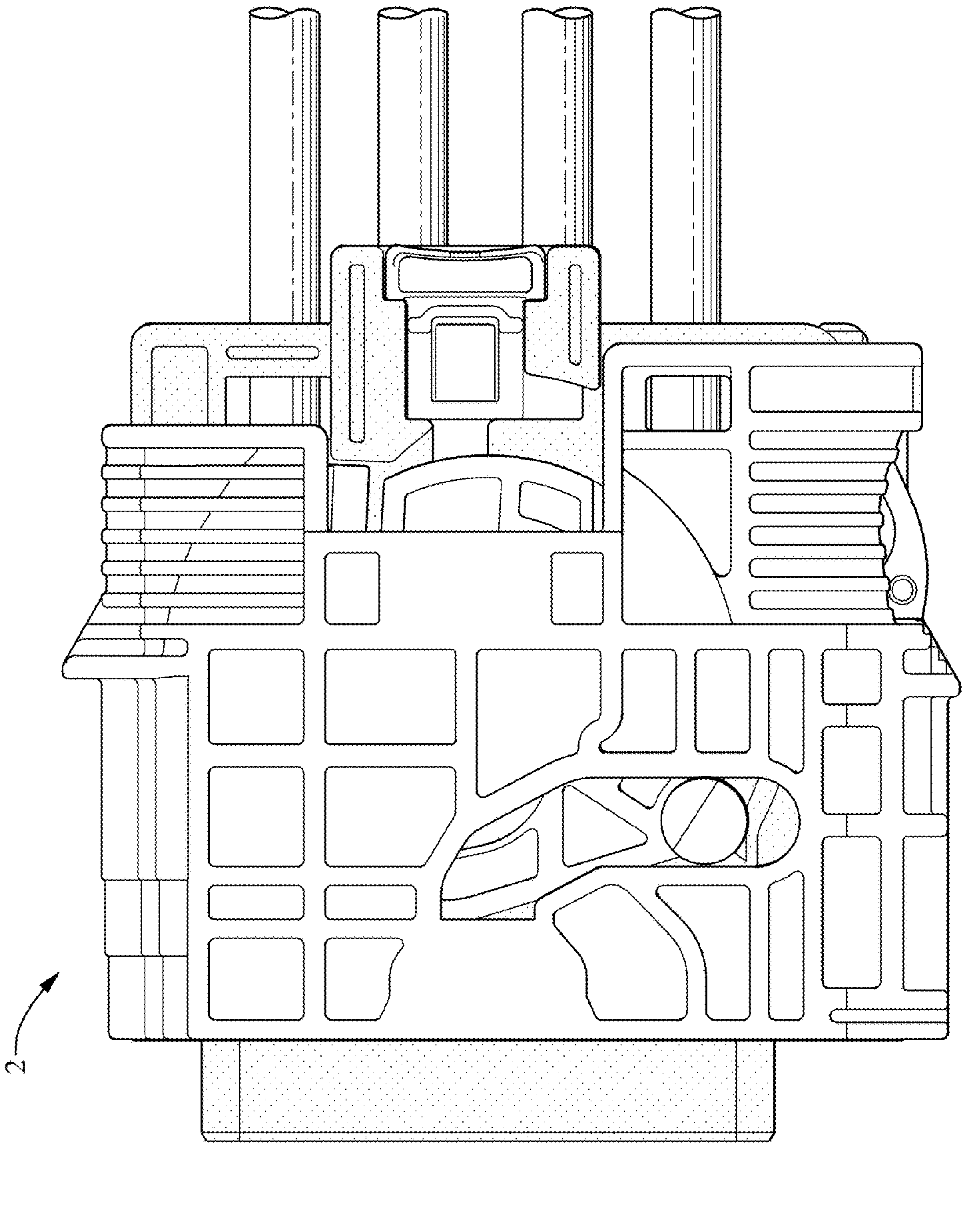
FIG. 9 is a top view of the connector assembly of FIG. 3 in accordance with some embodiments of the invention.
Figure 10:
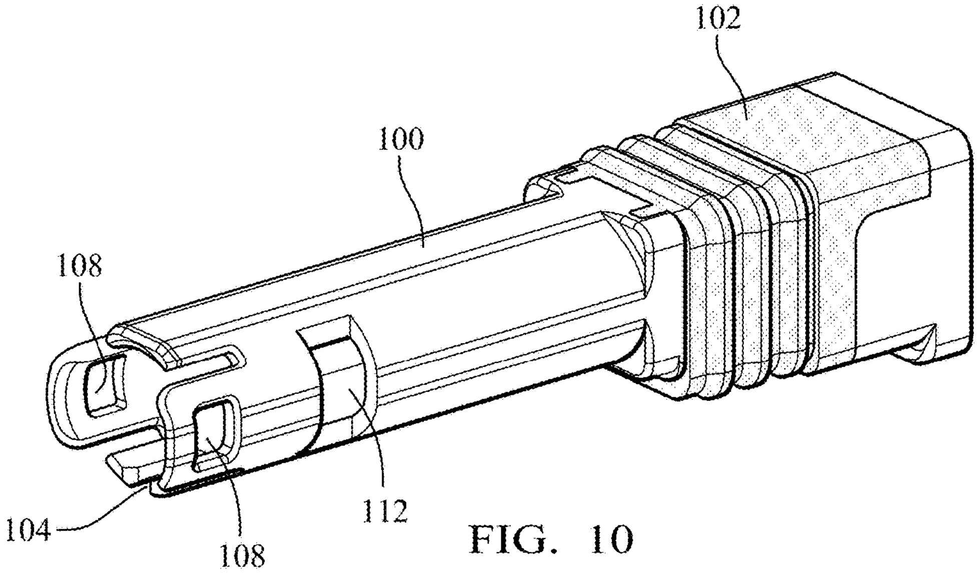
FIG. 10 is an isometric view of a terminal adapter of the connector assembly of FIG. 4 in accordance with some embodiments of the invention.
Figure 11:
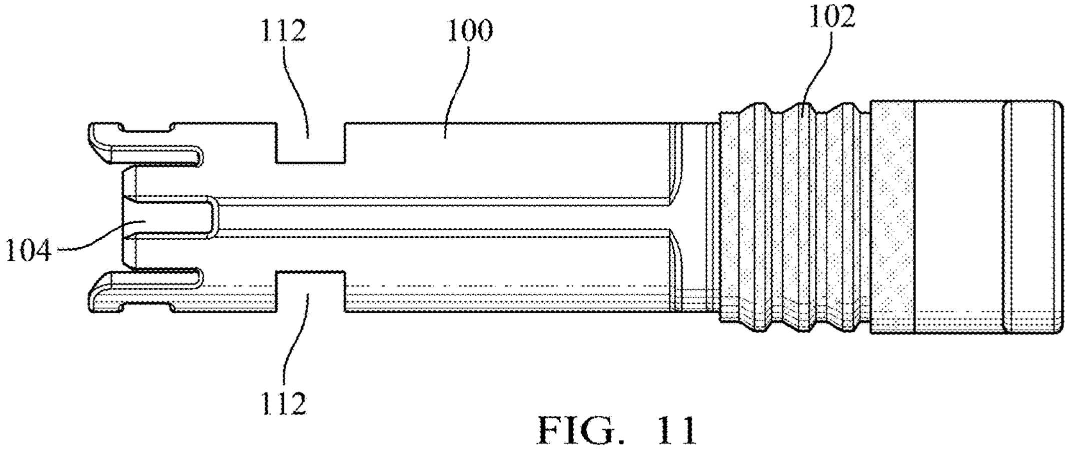
FIG. 11 is a side view of the terminal adapter of FIG. 10 in accordance with some embodiments of the invention.
Figure 12:
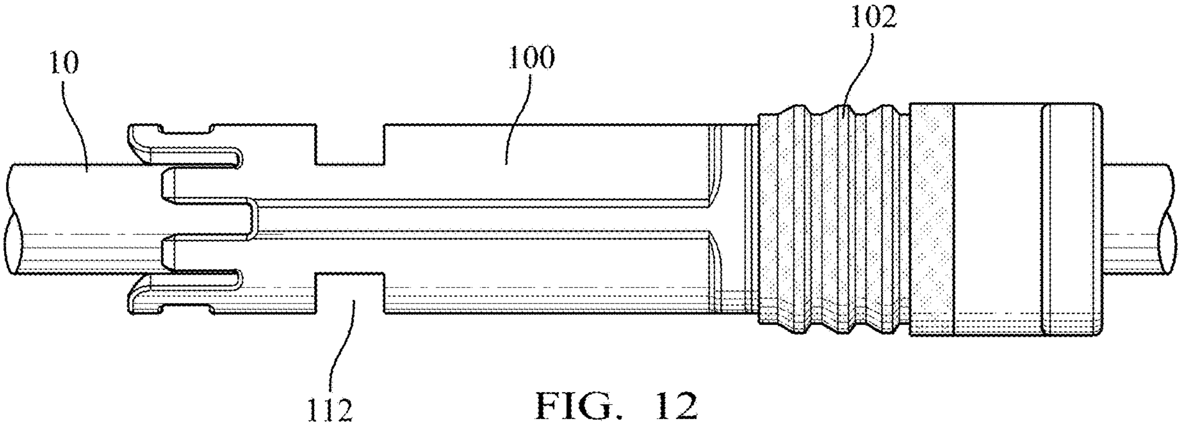
FIG. 12 is a side view of the terminal adapter of FIG. 10 with a cable inserted within in accordance with some embodiments of the invention.
Figure 13:
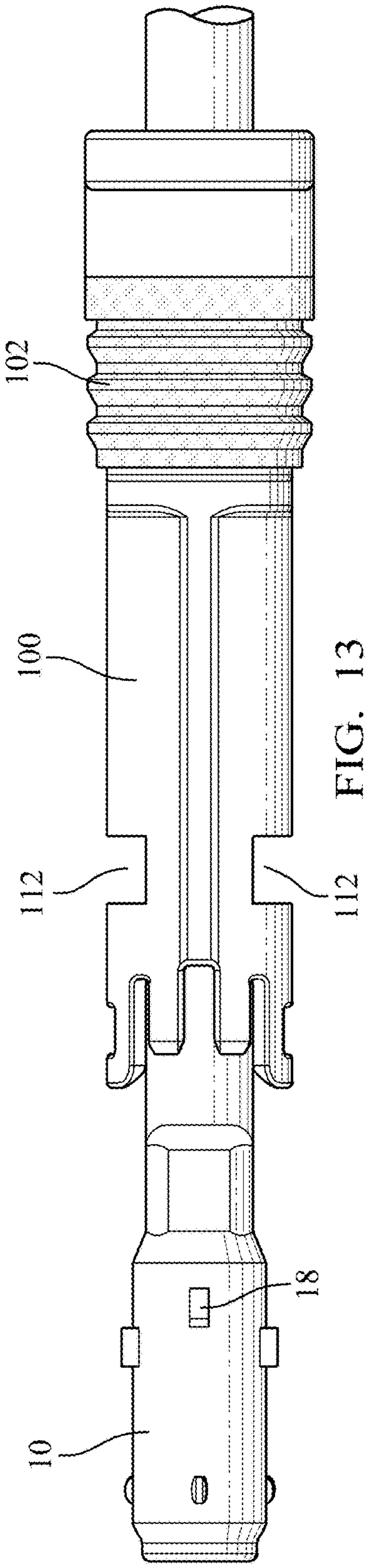
FIG. 13 is a top view of the terminal adapter of FIG. 10 with a terminal partially inserted within in accordance with some embodiments of the invention.
Figure 14:
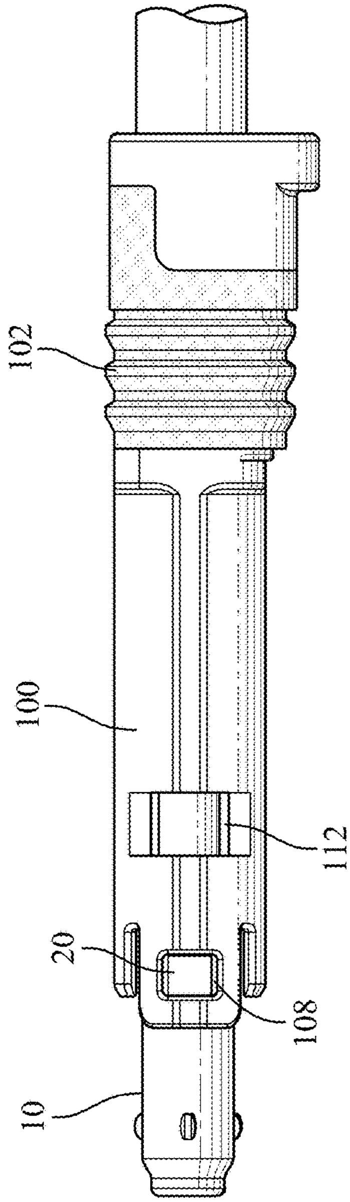
FIG. 14 is a side view of the terminal adapter of FIG. 10 with a terminal fully inserted within in accordance with some embodiments of the invention.
Figure 15:
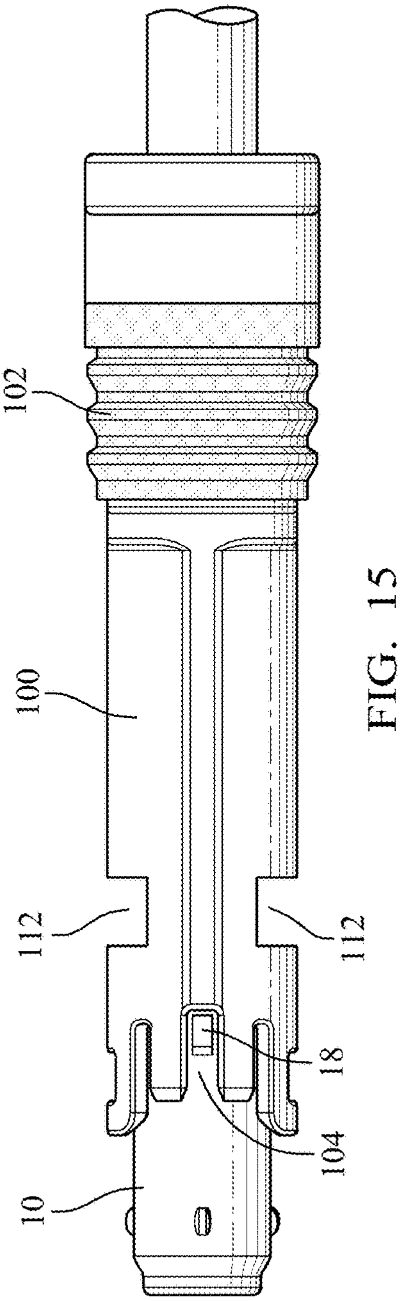
FIG. 15 is a top view of the terminal adapter of FIG. 10 with the terminal fully inserted within in accordance with some embodiments of the invention.
Figure 16:
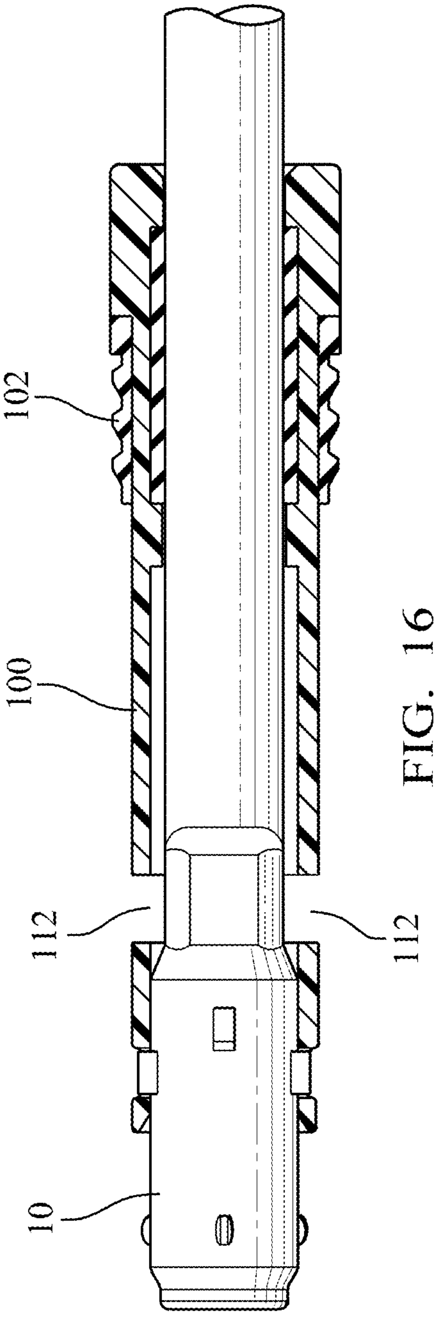
FIG. 16 is a cross-section top view of the terminal adapter of FIG. 10 with the terminal fully inserted within in accordance with some embodiments of the invention.
Figure 17:
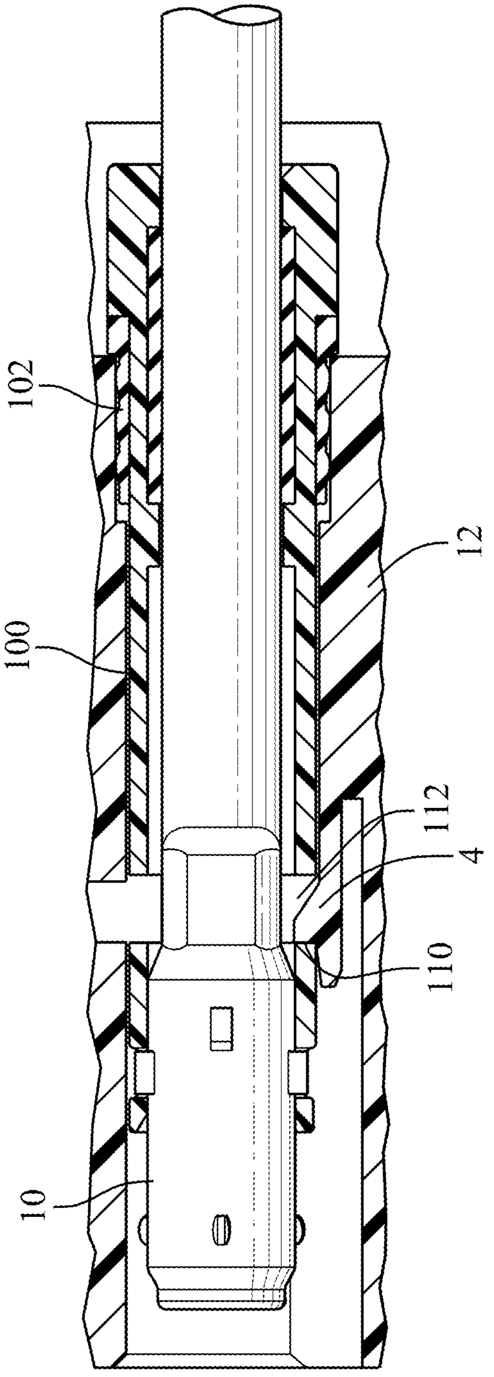
FIG. 17 is a cross-section top view of the terminal adapter of FIG. 10 engaging a primary lock within a terminal cavity of a connector body in accordance with some embodiments of the invention.
Figure 18:
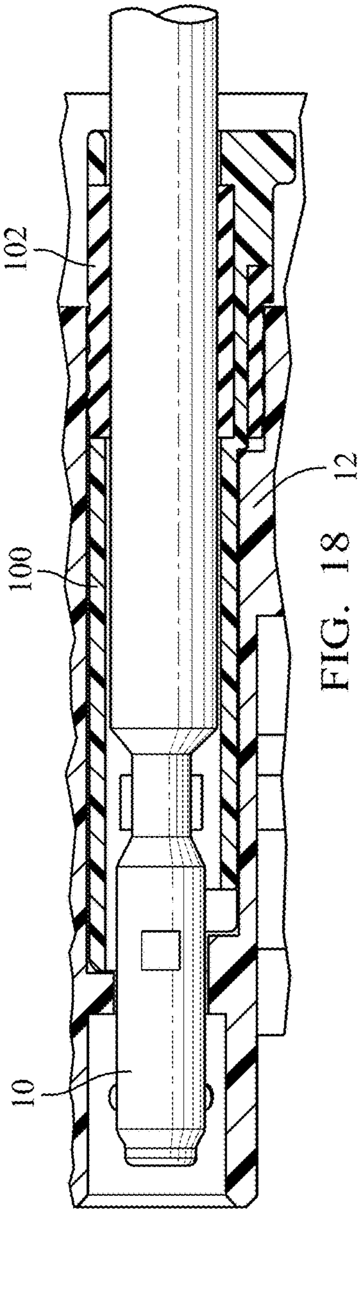
FIG. 18 is a cross-section right side view of the terminal adapter of FIG. 10 engaging a primary lock within a terminal cavity of a connector body in accordance with some embodiments of the invention.
Figure 19:
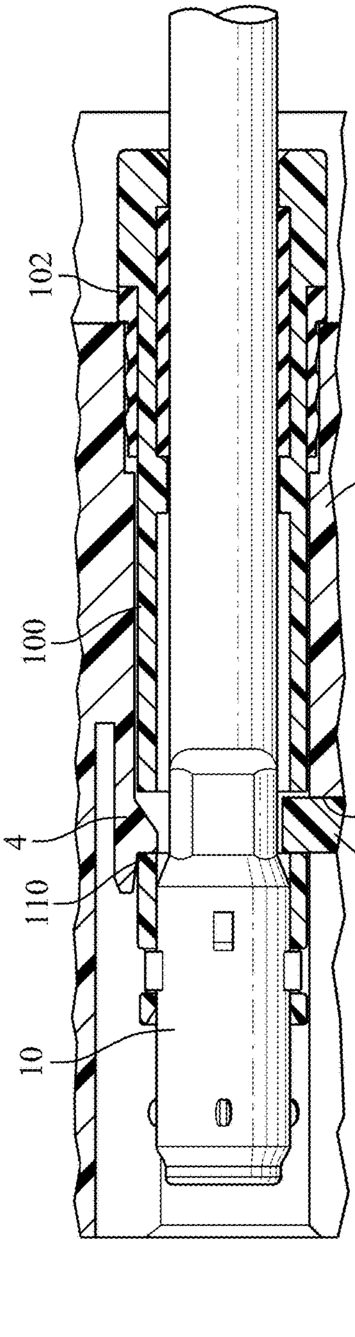
FIG. 19 is a cross-section bottom view of the terminal adapter of FIG. 10 engaging a secondary lock within a terminal cavity of a connector body in accordance with some embodiments of the invention.
Figure 20:
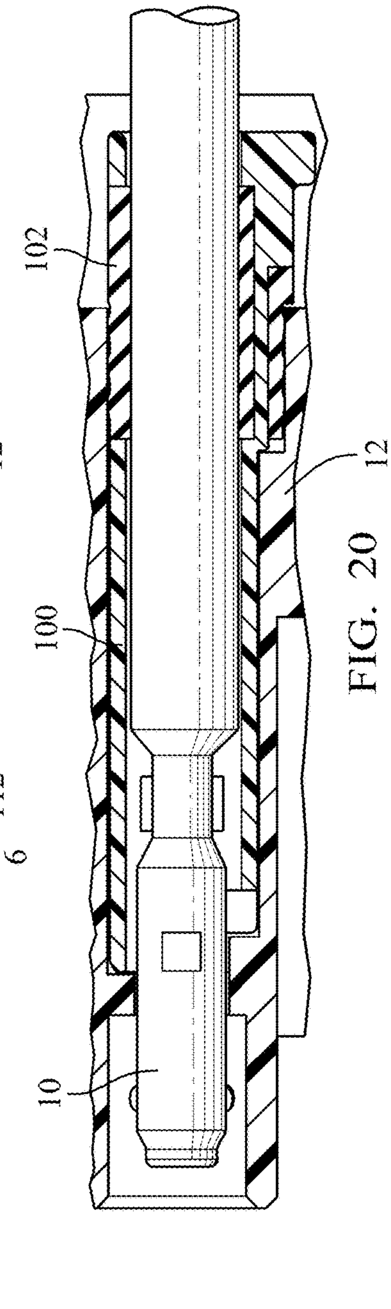
FIG. 20 is a cross-section left side view of the terminal adapter of FIG. 10 engaging a secondary lock within a terminal cavity of a connector body in accordance with some embodiments of the invention.
Figure 21A:
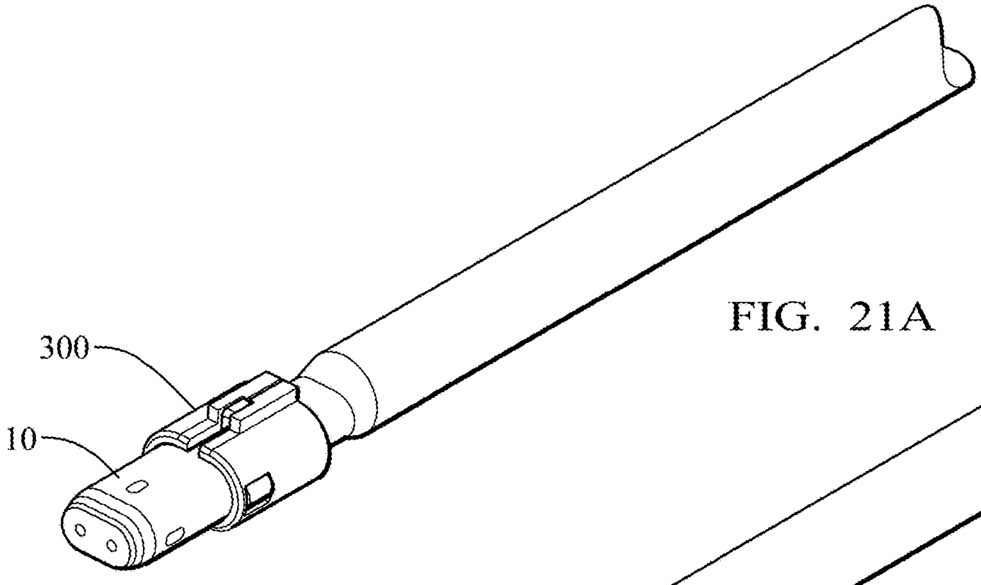
FIG. 21A is an isometric view of another terminal adapter engaging a terminal attached to a cable in accordance with some embodiments of the invention.
Figure 21B:
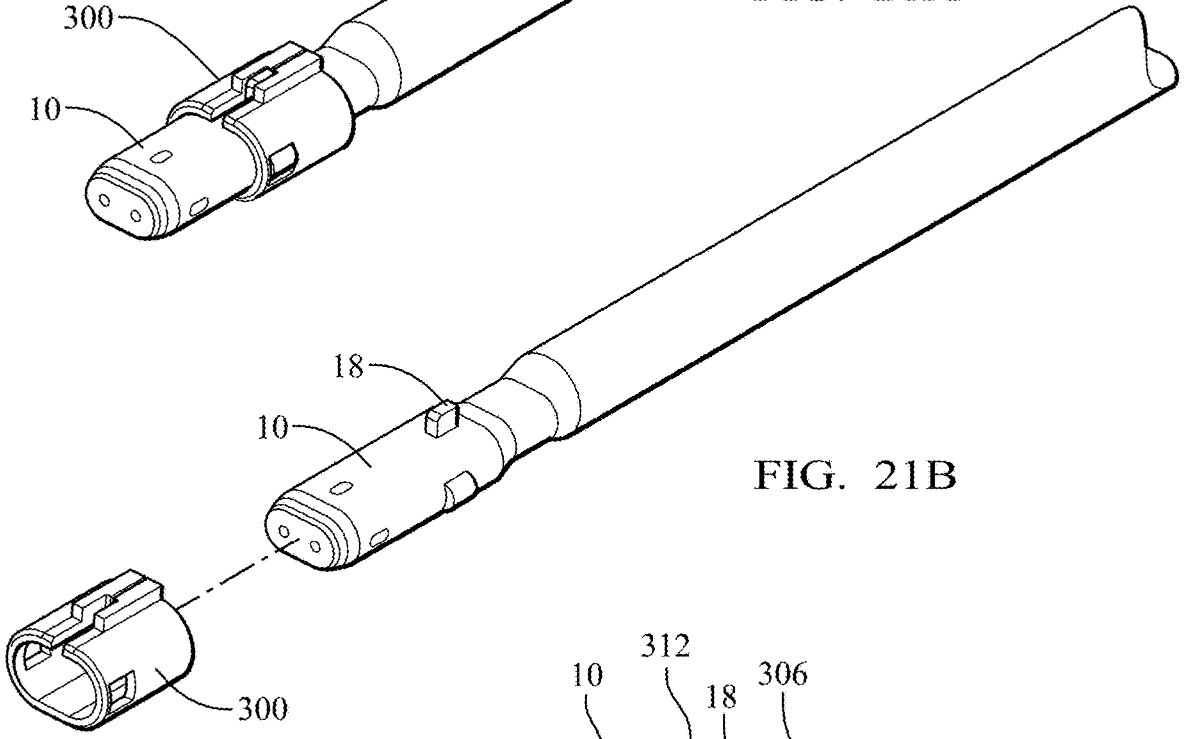
FIG. 21B is an exploded view of the terminal adapter and the terminal attached to the cable of FIG. 21A in accordance with some embodiments of the invention.
Figure 22A:
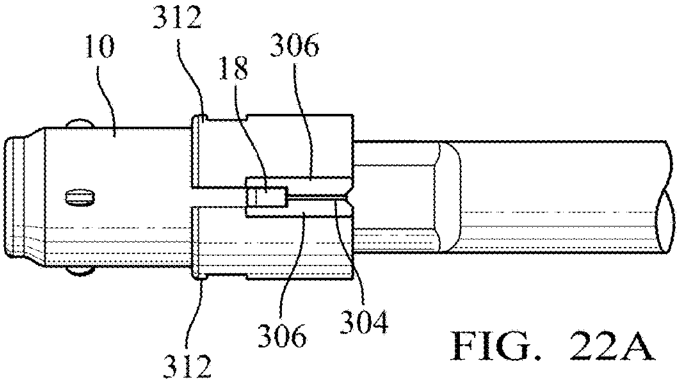
FIG. 22A is a top view of the terminal adapter and the terminal attached to the cable of FIG. 21A in accordance with some embodiments of the invention.
Figure 22C:
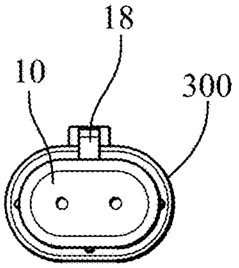
FIG. 22C is a side view of the terminal adapter and the terminal attached to the cable of FIG. 21A in accordance with some embodiments of the invention.
Figure 22B:
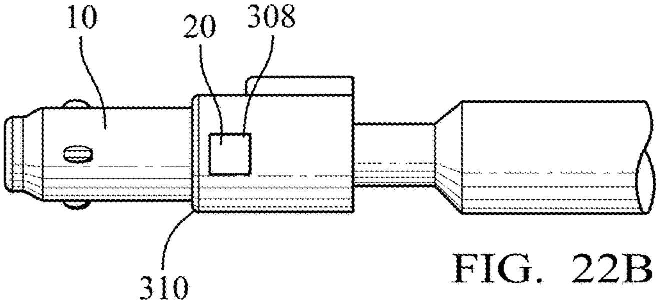
FIG. 22B is an end view of the terminal adapter and the terminal attached to the cable of FIG. 21A in accordance with some embodiments of the invention.
Figure 23:
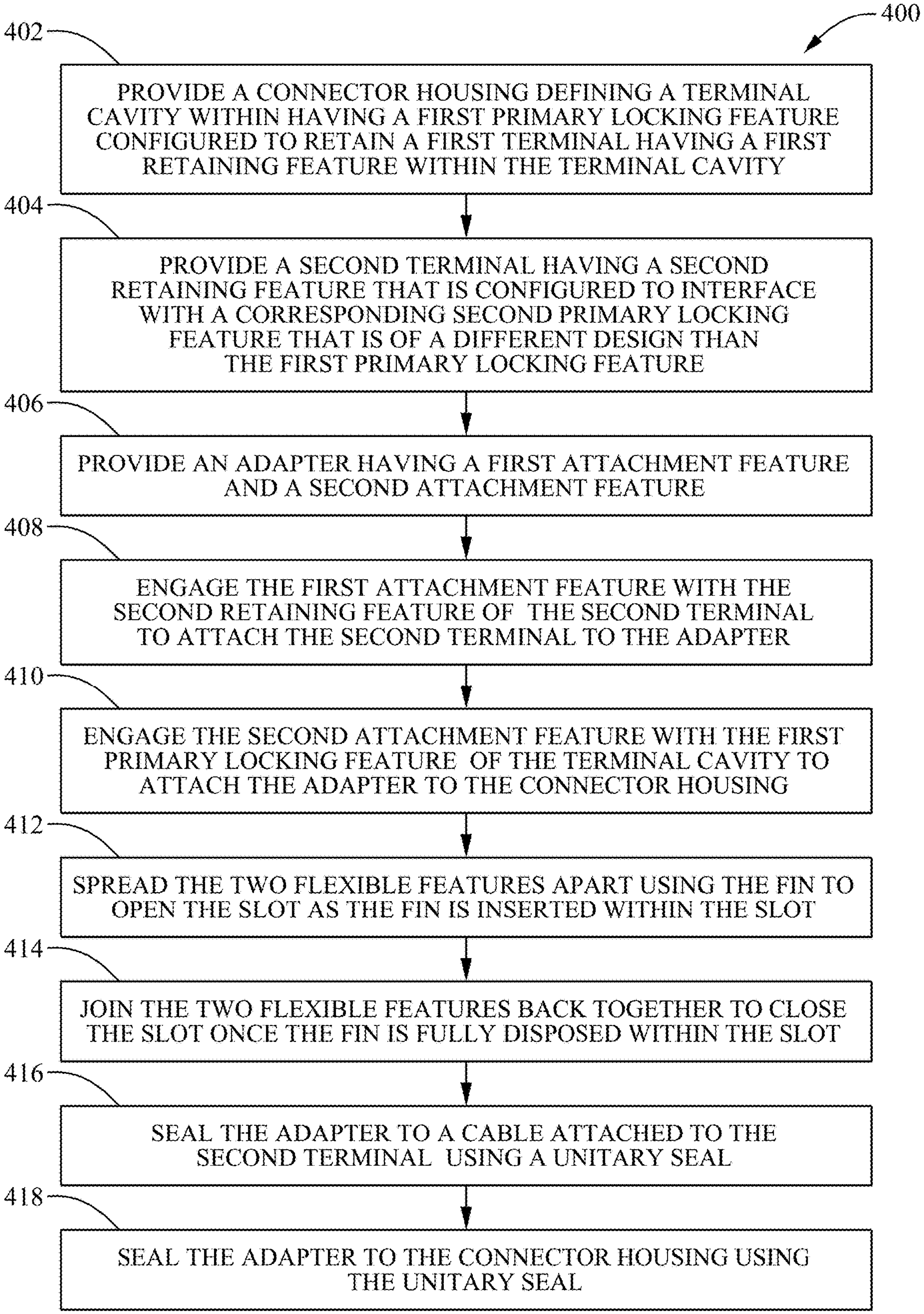
FIG. 23 is a flow chart of a method of assembling a connector assembly in accordance with some embodiments of the invention.

FIG. 4 shows three different adapters. The first adapter 100 is shown in detail in FIGS. 6 and 10-20. The second adapter 200 is shown in detail in FIG. 7. A third adapter 300 is shown in detail in FIGS. 8, 22, and 23.

The following paragraphs describe the first and second adapters 100, 200. The first adapter 100 includes a unitary seal 102 that is configured to seal the adapter 100 to a cable 24 attached to the terminal 10 and seal the adapter 100 to the connector housing 12. The second adapter 200 is substantially the same as the first adapter 100 but lacks the unitary seal 102. The second adapter 200 is configured for use with unsealed connector housings.

The adapter 100 defines a slot 104 configured to receive the fin 18 of the terminal 10. The adapter 100 includes apertures 108 in which one of the protrusions 20 extending from the sides of the terminal 10 is received. The adapter 100 has an edge 110, that extends perpendicularly to the insertion axis X of the terminal 10 and is configured to engage the latching mechanism 4 in the terminal cavity 3 of the connector housing 2.

The connector housing 2 also includes a secondary locking feature 6 that is configured to retain the adapter 100 within the terminal cavity. The secondary locking feature 6 is movable in a direction perpendicular to the insertion axis X and is configured to be disposed within an opening 112 in the adapter 100 to further retain the adapter 100 in the terminal cavity 3 of the connector housing 2. The edge 110 is formed by the opening 112.

The third adapter 300 defines two flexible features 312 flanking the slot 304 that open to receive the fin 18 and close once the fin is fully disposed within the slot 304. The adapter 300 has an edge 310 that extends perpendicularly to the insertion axis X and is configured to engage the latching mechanism 4 in the terminal cavity 3 of the connector housing 2. The adapter 300 includes a pair of flexible arms 306 extending parallel to the insertion axis X of the terminal into the adapter 300. Each arm of the pair of flexible arms 306 defines an aperture 308 in which one of the protrusions 20 extending from the sides of the terminal 10 is received.

A method 400 of assembling a connector contains:

STEP 402 which includes providing a connector housing 2 defining a terminal cavity 3 within, the terminal cavity 3 having a first primary locking feature 4 configured to retain a first terminal having a first retaining feature 5 within the terminal cavity 3;

STEP 404 which includes providing a second terminal 10 having a second retaining feature 18 that is configured to interface with a corresponding second primary locking feature 16 of the terminal cavity 3 that is of a different design than the first primary locking feature 4;

STEP 406 which includes providing an adapter 100, 200, 300 having a first attachment feature (apertures 108, 308) and a second attachment feature (edges 110, 310);

STEP 408 which includes engaging the first attachment feature (apertures 108, 308) of the adapter 100, 200, 300 with the second retaining feature 20 of the second terminal 10 to attach the second terminal 10 to the adapter 100, 200, 300; and STEP 410 which includes engaging the second attachment feature (edges 110, 310) of the adapter 100, 200, 300 with the first primary locking feature 5 of the terminal cavity 3 to attach the adapter 100, 200, 300 to the connector housing 2.

The method 400 may further contain:

STEP 412 which includes spreading the two flexible features 312 apart using the fin 18 to open the slot 304 as the fin 18 is inserted within the slot 304; and STEP 414 which includes joining the two flexible features 312 back together to close the slot 304 once the fin 18 is fully disposed within the slot 304 (STEP 414).

The method 400 may further contain:

STEP 416 which includes sealing the adapter 100 to a cable 22 attached to the second terminal 10 using the unitary seal 102 of the adapter 100 (STEP 416); and STEP 418 which includes sealing the adapter 100 to the connector housing 10 using the unitary seal 102 STEP 418). The unitary seal 102 is preferably co-molded with the adapter 100.

While the illustrated examples pertain to electrical connectors, other embodiments may be configured to connect other conductors such as fiber optic cables, pneumatic lines, hydraulic lines, etc., or a combination of any of these.

According to one or more aspects of the present disclosure, a connector assembly includes a connector housing defining a terminal cavity within, the terminal cavity having a first primary locking feature configured to retain a first terminal having a first retaining feature within the terminal cavity. The connector assembly also includes a second terminal having a second retaining feature that is configured to interface with a corresponding second primary locking feature of the terminal cavity that is of a different design than the first primary locking feature. The connector assembly further includes an adapter having a first attachment feature configured to engage with the second retaining feature of the second terminal to attach the second terminal to the adapter and having a second attachment feature configured to engage with the first primary locking feature of the terminal cavity to attach the adapter to the connector housing.

In some aspects of the connector assembly according to the previous paragraph, the second terminal is an electrical terminal attached to an electrical wire.

In some aspects of the connector assembly according to any one of the previous paragraphs, a size, shape, and arrangement of the second retaining feature is incompatible with engagement with the first primary locking feature.

In some aspects of the connector assembly according to any one of the previous paragraphs, the second terminal is secured within the terminal cavity by engagement of the second retaining feature of the second terminal with the first attachment feature of the adapter and engagement of the second attachment feature of the adapter with the first primary locking feature of the connector housing.

In some aspects of the connector assembly according to any one of the previous paragraphs, the second retaining feature of the second terminal is a fin extending perpendicularly to an insertion axis of the second terminal. The adapter defines a slot configured to receive the fin. The first attachment feature of the connector housing is a flexible latching hook configured to engage an edge of the adapter.

In some aspects of the connector assembly according to any one of the previous paragraphs, the adapter defines two flexible features flanking the slot that open to receive the fin and close once the fin is fully disposed within the slot.

In some aspects of the connector assembly according to any one of the previous paragraphs, the terminal cavity of the connector housing is a first terminal cavity. The adapter defines a second terminal cavity in which the second terminal is secured by the fin received within the slot.

In some aspects of the connector assembly according to any one of the previous paragraphs, the second terminal defines a pair of protrusions extending perpendicularly to the insertion axis, arranged opposite one another, and offset from the fin. The adapter includes a pair of flexible arms extending parallel to the insertion axis, each arm defining an aperture in which one of the protrusions is received.

In some aspects of the connector assembly according to any one of the previous paragraphs, the edge extends perpendicularly to the insertion axis.

In some aspects of the connector assembly according to any one of the previous paragraphs, the connector housing further includes a secondary locking feature configured to retain the adapter within the terminal cavity and movable in a direction perpendicular to the insertion axis and disposed within an opening in the adapter.

In some aspects of the connector assembly according to any one of the previous paragraphs, the adapter further includes a unitary seal configured to seal the adapter to a cable attached to the second terminal and seal the adapter to the connector housing.

According to one or more aspects of the present disclosure, an adapter configured to retain an electrical terminal within a terminal cavity of a connector housing that has incompatible terminal retaining features. The adapter includes a first attachment feature configured to engage with a retaining feature of the electrical terminal to secure the electrical terminal to the adapter and having a second attachment feature configured to engage with first primary locking feature of the terminal cavity to attach the adapter to the connector housing.

In some aspects of the adapter according to the previous paragraph, the retaining feature of the electrical terminal is a fin extending perpendicularly to an insertion axis of the second terminal. The adapter defines a slot configured to receive the fin. The first attachment feature of the connector housing is a flexible latching hook configured to engage an edge of the adapter.

In some aspects of the adapter according to the previous paragraph, the adapter defines two flexible features flanking the slot that open to receive the fin and close once the fin is fully disposed within the slot.

In some aspects of the adapter according to any one of the previous paragraphs, the electrical terminal defines a pair of protrusions extending perpendicularly to the insertion axis, arranged opposite one another, and offset from the fin. The adapter includes a pair of flexible arms extending parallel to the insertion axis, each arm defining an aperture in which one of the protrusions is received.

In some aspects of the adapter according to any one of the previous paragraphs, the edge extends perpendicularly to the insertion axis.

In some aspects of the adapter according to any one of the previous paragraphs, the adapter further includes a unitary seal configured to seal the adapter to a cable attached to the electrical terminal and seal the adapter to the connector housing.

According to one or more aspects of the present disclosure, a method of assembling a connector assembly includes the steps of:

providing a connector housing defining a terminal cavity within, the terminal cavity having a first primary locking feature configured to retain a first terminal having a first retaining feature within the terminal cavity;

providing a second terminal having a second retaining feature that is configured to interface with a corresponding second primary locking feature of the terminal cavity that is of a different design than the first primary locking feature;

providing an adapter having a first attachment feature and a second attachment feature;

engaging the first attachment feature of the adapter with the second retaining feature of the second terminal to attach the second terminal to the adapter; and engaging the second attachment feature of the adapter with the first primary locking feature of the terminal cavity to attach the adapter to the connector housing.

In some aspects of the method according to the previous paragraph, the retaining feature of the second terminal is a fin extending perpendicularly to an insertion axis of the first terminal. The adapter defines a slot between two flexible features. In this case, the method further includes:

spreading the two flexible features apart using the fin to open the slot as the fin is inserted within the slot; and joining the two flexible features back together to close the slot once the fin is fully disposed within the slot.

In some aspects of the method according to any one of the previous paragraphs, the adapter further includes a unitary seal. In this case, the method further includes:

sealing the adapter to a cable attached to the second terminal using the unitary seal; and sealing the adapter to the connector housing using the unitary seal.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A connector assembly, comprising:

a connector housing defining a terminal cavity within, the terminal cavity having a first primary locking feature configured to retain a first terminal having a first retaining feature within the terminal cavity;

a second terminal having a second retaining feature that is configured to interface with a corresponding second primary locking feature that is of a different design than the first primary locking feature; and an adapter having a first attachment feature configured to engage with the second retaining feature of the second terminal to attach the second terminal to the adapter and having a second attachment feature configured to engage with the first primary locking feature of the terminal cavity to attach the adapter to the connector housing, the connector housing further comprising a secondary locking feature configured to retain the adapter within the terminal cavity, the secondary locking feature is movable in a direction perpendicular to an insertion axis and disposed within an opening in the adapter.

2. The connector assembly according to claim 1, wherein the second terminal is an electrical terminal attached to an electrical wire.

3. The connector assembly according to claim 1, wherein a size, shape, and arrangement of the second retaining feature is incompatible with engagement with the first primary locking feature.

4. The connector assembly according to claim 1, wherein the second terminal is secured within the terminal cavity by engagement of the second retaining feature of the second terminal with the first attachment feature of the adapter and engagement of the second attachment feature of the adapter with the first primary locking feature of the connector housing.

5. The connector assembly according to claim 1, wherein the second retaining feature of the second terminal is a fin extending perpendicularly to an insertion axis of the second terminal, wherein the adapter defines a slot configured to receive the fin, and wherein the first attachment feature of the connector housing is a flexible latching hook configured to engage an edge of the adapter.

6. The connector assembly according to claim 5, wherein the adapter defines two flexible features flanking the slot that open to receive the fin and close once the fin is fully disposed within the slot.

7. The connector assembly according to claim 6, wherein the terminal cavity of the connector housing is a first terminal cavity and wherein the adapter defines a second terminal cavity in which the second terminal is secured by the fin received within the slot.

8. The connector assembly according to claim 5, wherein the second terminal defines a pair of protrusions extending perpendicularly to the insertion axis, arranged opposite one another, and offset from the fin and wherein the adapter comprises a pair of flexible arms extending parallel to the insertion axis, each arm defining an aperture in which one of the protrusions is received.

9. The connector assembly according to claim 5, wherein the edge extends perpendicularly to the insertion axis.

10. The connector according to claim 1, wherein the adapter further comprises a unitary seal configured to seal the adapter to a cable attached to the second terminal and seal the adapter to the connector housing.

11. An adapter configured to retain an electrical terminal within a terminal cavity of a connector housing that has incompatible terminal retaining features, the adapter comprising:

a first attachment feature configured to engage with a retaining feature of the electrical terminal to secure the electrical terminal to the adapter and having a second attachment feature configured to engage with a first primary locking feature of the terminal cavity to attach the adapter to the connector housing, the retaining feature of the electrical terminal comprising a fin extending perpendicularly to an insertion axis of the electrical terminal, the adapter defines a slot configured to receive the fin, the first primary locking feature of the connector housing comprising a flexible latching hook configured to engage an edge of the adapter, the electrical terminal defines a pair of protrusions extending perpendicularly to the insertion axis, arranged opposite one another, and offset from the fin, and the adapter comprises a pair of flexible arms extending parallel to the insertion axis, each arm defining an aperture in which one of the protrusions is received.

12. The adapter according to claim 11, wherein the adapter defines two flexible features flanking the slot that open to receive the fin and close once the fin is fully disposed within the slot.

13. The adapter according to claim 11, wherein the edge extends perpendicularly to the insertion axis.

14. The adapter according to claim 11, wherein the adapter further comprises a unitary seal configured to seal the adapter to a cable attached to the electrical terminal and seal the adapter to the connector housing.

15. A method of assembling a connector assembly, comprising:

providing a connector housing defining a terminal cavity within, the terminal cavity having a first primary locking feature configured to retain a first terminal having a first retaining feature within the terminal cavity;

providing a second terminal having a second retaining feature that is configured to interface with a corresponding second primary locking feature of the terminal cavity that is of a different design than the first primary locking feature;

providing an adapter having a first attachment feature and a second attachment feature;

engaging the first attachment feature of the adapter with the second retaining feature of the second terminal to attach the second terminal to the adapter;

engaging the second attachment feature of the adapter with the first primary locking feature of the terminal cavity to attach the adapter to the connector housing; and engaging a secondary locking feature in the connector housing in a direction perpendicular to an insertion axis such that the secondary locking feature is disposed within an opening in the adapter to retain the adapter within the terminal cavity.

16. The method according to claim 15, wherein the second retaining feature of the second terminal is a fin extending perpendicularly to an insertion axis of the first terminal, wherein the adapter defines a slot between two flexible features, and wherein the method further comprises:

spreading the two flexible features apart using the fin to open the slot as the fin is inserted within the slot; and joining the two flexible features back together to close the slot once the fin is fully disposed within the slot.

17. The method according to claim 15, wherein the adapter further comprises a unitary seal, and wherein the method further comprises:

sealing the adapter to a cable attached to the second terminal using the unitary seal; and sealing the adapter to the connector housing using the unitary seal.

* * * * *